US012742030B2

(12) United States Patent
Tanaka et al.

(10) Patent No.: US 12,742,030 B2
(45) Date of Patent: Sep. 22, 2026

(54) FINE RESIN PARTICLE AND APPLICATION THEREOF

(71) Applicant: SEKISUI KASEI CO., LTD., Osaka (JP)

(72) Inventors: Kohei Tanaka, Osaka (JP); Kohei Mitani, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 721 days.

(21) Appl. No.: 18/038,539

(22) PCT Filed: Dec. 6, 2021

(86) PCT No.: PCT/JP2021/044715
§ 371 (c)(1),
(2) Date: May 24, 2023

(87) PCT Pub. No.: WO2022/131052
PCT Pub. Date: Jun. 23, 2022

(65) Prior Publication Data

US 2024/0018286 A1 Jan. 18, 2024

(30) Foreign Application Priority Data

Dec. 15, 2020 (JP) ................................ 2020-207851

(51) Int. Cl.
*C08F 220/18* (2006.01)
*C08F 212/08* (2006.01)
*C08J 5/18* (2006.01)
*C08L 45/00* (2006.01)

(52) U.S. Cl.
CPC ...... *C08F 220/1804* (2020.02); *C08F 212/08* (2013.01); *C08J 5/18* (2013.01); *C08L 45/00* (2013.01); *C08F 2800/20* (2013.01); *C08J 2345/00* (2013.01); *C08J 2425/08* (2013.01); *C08J 2433/10* (2013.01); *C08L 2203/16* (2013.01)

(58) Field of Classification Search
CPC ................ C08F 222/102; C08F 220/14; C08F 220/1804; C08F 212/08
See application file for complete search history.

(56) References Cited

U.S. PATENT DOCUMENTS

2013/0266797 A1 10/2013 Teramoto et al.
2015/0005437 A1 1/2015 Teramoto
2016/0237230 A1* 8/2016 Sasata ..................... C08L 33/12
2020/0399413 A1* 12/2020 Nishiumi ................... C08J 9/26
2021/0347923 A1 11/2021 Tanaka et al.

FOREIGN PATENT DOCUMENTS

| | | | |
|---|---|---|---|
| EP | 2 754 692 | 7/2014 | |
| JP | 2006-337395 | 12/2006 | |
| JP | 2009-161600 | 7/2009 | |
| JP | 2010-95598 | 4/2010 | |
| JP | 2013-227535 | 11/2013 | |
| JP | 2017-57280 | 3/2017 | |
| JP | 2017-66362 | 4/2017 | |
| WO | 2019/182113 | 9/2019 | |
| WO | WO-2019182113 A1 * | 9/2019 | ............ C08F 257/02 |
| WO | 2020/054416 | 3/2020 | |

OTHER PUBLICATIONS

Office Action issued Jul. 2, 2024 in Japanese Patent Application No. 2020-207851, with English-language Translation.
Extended European Search Report issued Oct. 7, 2024 in European Patent Application No. 21906415.1.
International Preliminary Report on Patentability and Written Opinion of the International Searching Authority dated Jun. 29, 2023 in International (PCT) Application No. PCT/JP2021/044715, with English translation.
International Search Report (ISR) issued Jan. 25, 2022 in International (PCT) Application No. PCT/JP2021/044715.

* cited by examiner

*Primary Examiner* — Christopher M Rodd
(74) *Attorney, Agent, or Firm* — Wenderoth, Lind & Ponack, L.L.P.

(57) ABSTRACT

The invention has a problem of providing a fine resin particle that is useful as an anti-blocking agent or other agents, has sufficient resistance to the thermal load applied when compounded with resins, shows sufficiently lowered residual amount of unreacted monomers in the fine resin particle, and, furthermore, has a color tone that does not affect optical properties even when used in optical members, to which very high optical characteristics (colorless transparency) are required, or other members. As means for solving this problem, the present invention provides a fine resin particle including a copolymer of at least one monofunctional vinylic monomer (A) unit with a cyclic structure in a molecular structure, at least one monofunctional alkyl (meth)acrylate-based monomer (B) unit, at least one multifunctional (meth)acrylate-based monomer (C) unit, and at least one multifunctional thiol (D) unit, wherein a polymer consisting only of the monofunctional alkyl (meth)acrylate-based monomer (B) has a glass transition temperature of 50° C. or lower.

11 Claims, No Drawings

FINE RESIN PARTICLE AND APPLICATION THEREOF

CROSS-REFERENCE TO RELATED APPLICATIONS

This application is the U.S. National Phase under 35 U.S.C. § 371 of International Application PCT/JP2021/044715, filed Dec. 6, 2021, which claims priority to Japanese Patent Application No. JP 2020-207851, filed Dec. 15, 2020. The International Application was published under PCT Article 21 (2) in a language other than English.

TECHNIQUE FIELD

The present invention relates to a fine resin particle. Specifically, the present invention relates to a fine resin particle that is useful as an anti-blocking agent or other agents, has sufficient resistance to the thermal load applied when compounded with resins, shows sufficiently lowered residual amount of unreacted monomers in the fine resin particle, and, furthermore, has a color tone that does not affect optical properties even when used in optical members, to which very high optical characteristics (colorless transparency) are required, or other members.

BACKGROUND ART

Resin films have long been widely used for packaging materials and other applications. In recent years, the applications have been further expanding, and the properties required for resin films have become higher, especially in applications to optical components and electronic devices. The current challenge is to increase productivity while maintaining high quality.

Resin films are stored as rolls in many cases. However, such rolled resin films may stick to each other (blocking) in overlapping areas, resulting in poor slipperiness and peelability. Among them, COP (cyclic polyolefin) films are excellent in optical characteristics and moisture absorption resistance, but are likely to cause the problem mentioned above, compared to PMMA (polymethylmethacrylate) and TAC (triacetylcellulose) films. For this issue, it has been known to use various types of fillers, such as fine inorganic particles and fine organic particles, as anti-sticking agents (anti-blocking agents).

Examples of representative fillers include fine inorganic particles, such as silica, and fine organic particles, such as (meth)acrylic-based fine resin particles.

Fine inorganic particles are advantageous in their high hardness and can impart anti-stacking properties when added in a small amount. However, a refractive index difference occurs between inorganic particles and a resin film due to the material properties thereof, and disadvantages that may be factors for impairing transparency exist.

Meanwhile, fine organic particles are advantageous in that fine organic particles can also be used in resin films or other materials to which high qualities are required because fine organic particles can maintain the transparency of resin films and can impart anti-stacking properties.

PTL 1 discloses a fine organic particle characterized by including a base that contains a copolymer with alkyl (meth)acrylate-based monomer units with a carbon number in the alkyl group of 4 or more, crosslinking monomer units, and alkyl (meth)acrylate-based monomer units with a carbon number in the alkyl group of 1 or more and 3 or less; and an outer layer that contains a copolymer with alkyl (meth) acrylate-based monomer units with a carbon number in the alkyl group of 4 or more and crosslinking monomer units and is disposed on a surface of the base.

PTL 2 discloses a fine resin particle that includes a copolymer with alkyl (meth)acrylate-based monomer units with a carbon number in the alkyl group of 1 or more and 3 or less, alkyl (meth)acrylate-based monomer units with a carbon number in the alkyl group of 4 or more, and crosslinking (meth)acrylic monomer units; and an antioxidant.

CITATION LIST

Patent Literature

[PTL 1] Japanese Patent Application Publication No. 2017-057280

[PTL 2] Japanese Patent Application Publication No. 2017-66362

SUMMARY OF INVENTION

Technical Problem

Fine organic particles, especially fine resin particles, are poorer in hardness than fine inorganic particles. Thus, they are required to increase the addition amount thereof to improve anti-sticking performance. One issue is that as the addition amount of additive increases, the impact on film haze and other factors increases. Another issue is that resin drooling may occur, and yield may be lowered due to thermal load or other factors when compounded with resins, or unreacted monomers in fine resin particles. For this reason, fine resin particles that are resistant to thermal load and have minimal residual unreacted monomer amount have been demanded.

The present inventors have considered that fine organic particles disclosed in the literature mentioned above have insufficient heat resistance to the thermal load applied when compounded with resins, as well as a not-sufficiently-reduced residual amount of unreacted monomers.

A problem of the present invention is to provide a fine resin particle with sufficient heat resistance that can withstand the thermal load applied when compounded with resins and a sufficiently-reduced residual amount of unreacted monomers in the fine resin particle.

Solution to Problem

The present inventors have studied to solve the above problem and, as a result, found that copolymerization of a specific monomer and a multifunctional thiol, which is an antioxidant, provides a fine resin particle with sufficient heat resistance that can withstand thermal load and a sufficiently-reduced residual amount of unreacted monomers in the fine resin particle as mentioned above, and completed the present invention.

The present invention has the inventive concepts below, although it is not limited thereto.

[1] A fine resin particle including a copolymer of at least one monofunctional vinylic monomer (A) unit with a cyclic structure in a molecular structure, at least one monofunctional alkyl (meth)acrylate-based monomer (B) unit, at least one multifunctional (meth)acrylate-based monomer (C) unit, and at least one multifunctional thiol (D) unit, wherein a polymer consisting only of a monofunctional alkyl (meth)acrylate-based monomer (B) has a glass transition temperature of 50° C. or lower.

[2] The fine resin particle according to [1], which is produced by seed polymerization in which seed particles are swollen with a monomers in a medium, and then the monomers are polymerized, wherein the monomers include at least one monofunctional vinylic monomer (A) with a cyclic structure in a molecular structure, at least one monofunctional alkyl (meth) acrylate-based monomer (B), at least one multifunctional (meth)acrylate-based monomer (C), and at least one multifunctional thiol (D).

[3] The fine resin particle according to [1] or [2], wherein a 5% thermal decomposition initiation temperature under a nitrogen atmosphere is 345° C. or higher and/or a weight loss rate after holding at 270° C. for 40 minutes under an air atmosphere is 30% or less.

[4] The fine resin particle according to any one of [1] to [3], wherein a total residual monomer amount of a monofunctional vinylic monomer (A) with a cyclic structure in a molecular structure, a monofunctional alkyl (meth)acrylate-based monomer (B), and a multifunctional (meth)acrylate-based monomer (C) is 300 ppm by mass or less.

[5] The fine resin particle according to any one of [1] to [4], wherein a sulfur element content in the fine resin particle is 0.20 parts by mass or more.

[6] The fine resin particle according to any one of [1] to [5], wherein a residual surfactant amount in the fine resin particle is 10,000 ppm by mass or more and 30,000 ppm by mass or less.

[7] The fine resin particle according to any one of [1] to [6], wherein a volume average primary particle size is 100 nm or more and 5,000 nm or less and/or a coefficient of variation of a volume average primary particle size is 25% or less.

[8] The fine resin particle according to any one of [1] to [7], wherein the multifunctional (meth)acrylate-based monomer (C) is a bifunctional (meth)acrylate monomer.

[9] The fine resin particle according to any one of [1] to [8], wherein an amount of the multifunctional thiol (D) unit is 0.1 parts by mass or more and 10 parts by mass or less in relation to 100 parts by mass of a total of the monofunctional vinylic monomer (A) unit with a cyclic structure in a molecular structure, the monofunctional alkyl (meth)acrylate-based monomer (B) unit, and the multifunctional (meth)acrylate-based monomer (C) unit.

[10] A granulated body composed of a plurality of fine resin particles according to any one of [1] to [9] agglomerated together.

[11] The fine resin particle according to any one of [1] to [9] or a granulated body thereof, which is used as an anti-sticking agent for a resin film.

[12] The fine resin particle or a granulated body thereof according to [11], wherein the resin film is a cyclic olefin resin film.

Advantageous Effects of Invention

According to the present invention, a fine resin particle with sufficient heat resistance that can withstand the thermal load applied when compounded with resins and a sufficiently-reduced residual amount of unreacted monomers in the fine resin particle can be provided.

DESCRIPTION OF EMBODIMENTS

[Fine Resin Particle]

A fine resin particle according to the present invention is a fine resin particle that includes a copolymer of at least one monofunctional vinylic monomer (A) unit with a cyclic structure in a molecular structure, at least one monofunctional alkyl (meth)acrylate-based monomer (B) unit, at least one multifunctional (meth)acrylate-based monomer (C) unit, and at least one multifunctional thiol (D) unit, wherein a polymer consisting only of a monofunctional alkyl (meth) acrylate-based monomer (B) has a glass transition temperature of 50° C. or lower.

<Monofunctional Vinylic Monomer (A) with Cyclic Structure in Molecular Structure>

Examples of monofunctional vinylic monomers (A) with a cyclic structure in a molecular structure include monofunctional vinylic monomers with a cyclic structure, such as an aromatic ring or an alicyclic ring, in a molecular structure. Specific examples thereof include styrenic monomers such as styrene, α-methylstyrene, o-methylstyrene, m-methylstyrene, p-methylstyrene, ethylvinylbenzene, p-tert-butylstyrene, p-methoxystyrene, p-phenylstyrene, o-chlorostyrene, m-chlorostyrene, p-chlorostyrene, vinylnaphthalene, styrenesulfonic acid, styrenesulfonic acid salts (including sodium styrenesulfonate, ammonium styrenesulfonate, etc.), vinylbenzoic acid, and hydroxystyrene; and vinylcycloolefin-based monomers such as vinylcyclohexane, vinylcycloheptane, and vinylcyclooctane. Examples of cyclic olefins include cycloolefin-based monomers such as cyclohexene and 2-norbornene; and (meth)acrylic esters with a cyclic structure in the ester moiety, such as cyclohexyl (meth)acrylate, isobornyl (meth)acrylate, dicyclopentanyl (meth)acrylate, benzyl (meth)acrylate, phenyl (meth)acrylate, phenoxyethyl (meth)acrylate, 2-(meth)acryloyloxyethyl phthalate, and 2-(meth)acryloyloxyethyl hexahydrophthalate. In the present invention, a monofunctional alkyl (meth)acrylate-based monomer with a cyclic structure in a molecular structure, such as benzyl (meth)acrylate or cyclohexyl (meth)acrylate, shall be treated as a monofunctional vinylic monomer (A) with a cyclic structure in a molecular structure. Among these, styrene, α-methylstyrene, and sodium styrenesulfonate are preferred.

These monofunctional vinylic monomers (A) with a cyclic structure in a molecular structure may be used singly, or two or more thereof may be mixed and used.

<Monofunctional Alkyl (Meth)Acrylate-Based Monomer (B)>

A monofunctional alkyl (meth)acrylate-based monomer (B) is not particularly limited as long as the glass transition temperature Tg of a polymer consisting only of the monofunctional alkyl (meth)acrylate-based monomer (B) is 50° C. or lower.

Here, the polymer consisting only of the monofunctional alkyl (meth)acrylate-based monomer (B) refers to a (co) polymer obtained when only monofunctional alkyl (meth) acrylate-based monomers are extracted from the monomers constituting the fine resin particle and polymerized while maintaining the mass ratio between the monomers. This (co) polymer is a homopolymer when only one type of the monofunctional alkyl (meth)acrylate-based monomer (B) is used and is a copolymer when two or more types of monofunctional alkyl (meth)acrylate-based monomers (B) are used.

In the present invention, at least one monofunctional alkyl (meth)acrylate-based monomer that produces a homopolymer with a glass transition temperature Tg of 50° C. or lower may be used as the monofunctional alkyl (meth)acrylate-based monomer (B). Alternatively, at least one monofunctional alkyl (meth)acrylate-based monomer that produces a homopolymer with a glass transition temperature Tg of 50° C. or lower and at least one monofunctional alkyl (meth) acrylate-based monomer that produces a homopolymer with a glass transition temperature Tg of over 50° C. may be used in combination, and a monomer combination that produces a copolymer with a glass transition temperature Tg of 50° C. or lower may be used. Among these, it is preferred to use at least one monofunctional alkyl (meth)acrylate-based monomer that produces a homopolymer with a glass transition temperature Tg of 50° C. or lower, as the monofunctional alkyl (meth)acrylate-based monomer(s) (B).

The present inventors speculate that the use of a monofunctional alkyl (meth)acrylate-based monomer, the polymer consisting only of which has a glass transition temperature Tg of 50° C. or lower, as the monofunctional alkyl (meth)acrylate-based monomer (B) would increase the frequency of contact between the polymer growth chain and unreacted monomers and reduces the amount of residual monomer amount in view of the polymer chain driveability. However, the invention is not bound to this speculation.

In the present invention, the glass transition temperature Tg means a value determined by converting the glass transition temperature Tga represented by an absolute temperature, calculated from the equation (1) below, into the unit of degrees Celsius.

$$1/Tga=\Sigma(Wi/Tgi) \quad (1)$$

(In the formula (1), Tga represents a glass transition temperature (in terms of absolute temperature) of a polymer consisting only of a monofunctional alkyl (meth)acrylate-based monomer (B). Wi represents a mass proportion of each monofunctional alkyl (meth)acrylate-based monomer i in a polymer consisting only of the monofunctional alkyl (meth)acrylate-based monomer (B). Tgi represents a glass transition temperature (in terms of absolute temperature) of a homopolymer formed only from each monofunctional alkyl (meth)acrylate-based monomer i.)

The equation (1) is called the FOX equation and is used for calculating the glass transition temperature Tga of a polymer based on the glass transition temperature Tgi of the homopolymer of an individual monomer constituting a polymer. The details are described in Bulletin of the American Physical Society, Series 2, vol. 1, No. 3, page 123 (1956). Glass transition temperatures (Tgi) of homopolymers of various monomers for calculation with the FOX equation may adopt the values described, for example, in "The finish & paint" ("Tosou to Toryo") (Toryo Shuppan K.K., 10 (No. 358), 1982). The glass transition temperature of a homopolymer from a monomer, the glass transition temperature of which is unknown, shall be a measured value about a homopolymer with a weight average molecular weight of about 20,000 to 50,000. This measured value may be determined by removing volatile components, such as solvents, from a sample in a measurement cup by vacuum aspiration, then measuring the calorie change in the range of −50° C. to +150° C. by a ramp rate of 3° C./min using a differential scanning thermal analyzer, "DSC-50Q" (trade name, manufactured by Shimadzu Corporation), and determining the measured value using the first changing point of the baseline on the lower temperature side.

The glass transition temperature Tg of a polymer consisting only of the monofunctional alkyl (meth)acrylate-based monomer (B), obtained by converting the glass transition temperature calculated with the FOX equation into the unit of degrees Celsius is 50° C. or lower, preferably 40° C. or lower, and more preferably 20° C. or less. The lower limit of Tg is, for example, −50° C. and preferably −30° C.

Examples of the monofunctional alkyl (meth)acrylate-based monomer (B) include alkyl (meth)acrylate esters with an alkyl group with a carbon number of 1 to 20 attached to an ester, such as methyl (meth)acrylate (methyl methacrylate and methyl acrylate), ethyl (meth)acrylate, propyl (meth) acrylate, isopropyl (meth)acrylate, n-butyl (meth)acrylate, isobutyl meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth) acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isostearyl (meth)acrylate, nonadecyl (meth)acrylate, eicosyl (meth)acrylate, and other (meth) acrylates.

Among these, methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth) acrylate, isooctyl (meth)acrylate, nonyl (meth)acrylate, isononyl (meth)acrylate, and decyl (meth)acrylate, which have an alkyl group with a carbon number of 1 to 10 attached to an ester, are preferred because they are generic products. In particular, in the application requiring heat resistance, methyl methacrylate and n-butyl acrylate are preferably included in view of generality, cost, handling ability, or other reasons. These monofunctional alkyl (meth)acrylate-based monomers (B) may be used singly, or two or more thereof may be mixed and used, as long as the glass transition temperature Tg of a polymer consisting only of the monofunctional alkyl (meth)acrylate-based monomer (B) is 50° C. or lower.

Among these monofunctional alkyl (meth)acrylate-based monomers (B), examples of monomers that produce a homopolymer with a glass transition temperature Tg of 50° C. or lower include 2-ethylhexyl acrylate (−70° C.), n-octyl acrylate (−65° C.), n-lauryl methacrylate (−65° C.), isodecyl acrylate (−60° C.), isooctyl acrylate (−58° C.), isononyl acrylate (−58° C.), n-butyl acrylate (−55° C.), tridecyl acrylate (−55° C.), isodecyl methacrylate (−41° C.), tridecyl methacrylate (−40° C.), isobutyl acrylate (−26° C.), n-lauryl acrylate (−23° C.), ethyl acrylate (−20° C.), isostearyl acrylate (−18° C.), 2-ethylhexyl methacrylate (−10° C.), methyl acrylate (10° C.), n-butyl methacrylate (20° C.), n-stearyl acrylate (30° C.), propyl methacrylate (35° C.), n-stearyl methacrylate (38° C.), isobutyl methacrylate (48° C.) (the temperatures in parentheses represent the glass transition temperature Tg of homopolymers), and other monomers.

<Multifunctional (Meth)Acrylate-Based Monomer (C)>

Examples of multifunctional (meth)acrylate-based monomers (C) include ethylene glycol di(meth)acrylate, diethylene glycol di(meth)acrylate, triethylene glycol di(meth) acrylate, decaethylene glycol di(meth)acrylate, pentadecaethylene glycol di(meth)acrylate, pentacontahectaethylene glycol di(meth)acrylate, 1,3-butylene di(meth)

acrylate, allyl (meth)acrylate (allyl methacrylate and allyl acrylate), trimethylolpropane tri(meth)acrylate, pentaerythritol tetraacrylate, dipentaerythritol hexa(meth)acrylate, and other (meth)acrylates. Among these, bifunctional (meth) acrylate monomers, such as ethylene glycol di(meth)acrylate (ethylene glycol dimethacrylate) and allyl (meth)acrylate (allyl methacrylate), are preferred. These multifunctional (meth)acrylate-based monomers (C) may be used singly, or two or more thereof may be mixed and used.

<Multifunctional Thiol (D)>

The multifunctional thiol (D) is not particularly limited as long as it is a compound with two or more thiol groups in a molecule. Examples thereof include multifunctional thiol group-containing monomers such as 1,2-ethanedithiol, 1,3-propanedithiol, 1,4-butanedithiol, 1,6-hexanedithiol, 1,8-octanedithiol, 1,2-cyclohexanedithiol, decanedithiol, ethylene glycol bis(thiopropionate), ethylene glycol bis(thioglycolate) (EGTG), 1,4-butanediol bis(thiopropionate) (BDTG), trimethylolpropane tris(thioglycolate) (TMTG), trimethylolpropane tristhiopropionate), pentaerythritol tetrakis(thioglycolate) (PETG), pentaerythritol tetrakis(thiopropionate), dipentaerythritol hexathiopropionate, trimercaptopropanoic acid tris(2-hydroxyethyl)isocyanurate, 1,4-dimethylmercaptobenzene, 2,4,6-trimercapto-s-triazine, 2-(N,N-dibutylamino)-4,6-dimercapto-s-triazine, and other multifunctional thiols. Among these, at least one selected from the group consisting of ethylene glycol bis(thioglycolate) (EGTG), 1,4-butanediol bis(thiopropionate) (BDTG), trimethylolpropane tris(thioglycolate) (TMTG), pentaerythritol tetrakis(thioglycolate) (PETG) may be mentioned.

These multifunctional thiols (D) may be used singly, or two or more thereof may be mixed and used.

<Other Monomers (E)>

The fine resin particle of the present invention may contain other monomer (E) units than the monofunctional vinylic monomer (A) unit with a cyclic structure in a molecular structure, the monofunctional alkyl (meth)acrylate-based monomer (B) unit, the multifunctional (meth) acrylate-based monomer (C) unit, and the multifunctional thiol (D) unit.

Examples of other monomers (E) include at least one unsaturated carboxylic acid-based monomer selected from the group consisting of unsaturated carboxylic acid-based monomers such as (meth)acrylic acid and maleic acid; hydroxyalkyl (meth)acrylate-based monomers such as hydroxyethyl (meth)acrylate; (meth)acrylic amide-based monomers; (meth)acrylonitrile-based monomers, halogenated vinylic monomers such as vinyl chloride; vinyl carboxylate-based monomers such as vinyl acetate; olefinic monomers such as ethylene; unsaturated imide-based monomers; vinyl alcohol; divinylic monomers such as m-divinylbenzene, p-divinylbenzene, and divinyl naphthalene These other monomers (E) may be used singly, or two or more thereof may be mixed and used.

<Amount Ratio of Each Unit>

In the fine resin particle of the present invention, the amount proportions of each unit of the monofunctional vinylic monomer (A) unit with a cyclic structure in a molecular structure, the monofunctional alkyl (meth)acrylate-based monomer (B) unit, the multifunctional (meth) acrylate-based monomer (C) unit, the multifunctional thiol (D) unit, and the other monomer (E) unit are not particularly limited, and, for example, may preferably be the amount proportions described below.

The amount proportion of the monofunctional vinylic monomer (A) unit with a cyclic structure in a molecular structure may be, for example, 5 to 80 parts by mass, preferably 10 to 70 parts by mass, and more preferably 15 to 60 parts by mass in relation to 100 parts by mass of the total of (A) to (E) units.

If the amount proportion of the (A) unit is less than 5 parts by mass, the refractive index difference with a film-forming binder resin may increase, which may result in reduced transparency when a film containing the fine resin particle is formed.

If the amount proportion of the (A) unit exceeds 80 parts by mass, the residual monomer amount in the fine resin particle may not be sufficiently reduced.

The amount proportion of the monofunctional alkyl (meth)acrylate-based monomer (B) may be, for example, 5 to 80 parts by mass, preferably 10 to 70 parts by mass, and more preferably 15 to 60 parts by mass in relation to 100 parts by mass of the total of (A) to (E) units.

If the amount proportion of the (B) unit is less than 5 parts by mass, the residual monomer amount in the fine resin particle may not be sufficiently reduced.

If the amount proportion of the (B) unit exceeds 80 parts by mass, the fine resin particle may have excessive flexibility, and the desired effect may not be obtained.

The amount proportion of the multifunctional (meth) acrylate-based monomer (C) unit may be, for example, 5 to 50 parts by mass, preferably 7 to 40 parts by mass, more preferably 10 to 30 parts by mass, and still more preferably 15 to 24 parts by mass in relation to 100 parts by mass of the total of (A) to (E) units. When the amount proportion of the (C) unit is in this range, the solvent resistance of the particle is improved, and deformation of the particle can be prevented when the particle is compounded in a film. If the multifunctional (meth)acrylate-based monomer (C) unit is less than 5 parts by mass, the degree of crosslinking of fine resin particles becomes low, and when a resin composition in which the fine resin particle is mixed with a binder resin is used as a coating solution, the fine resin particle may swell, causing a viscosity increase of the coating solution, lowered workability of the coating process, and lowered degree of crosslinking, and, as a result, melting or deformation of fine resin particle is likely to occur when heat is applied to the fine resin particle in an application in which the fine resin particle is mixed with a binder and shaped (so-called kneading application), and other applications.

If the multifunctional (meth)acrylate-based monomer (C) unit exceeds 50 parts by mass, improvement in effectiveness may not be commensurate with the amount used, and production costs may increase.

The amount proportion of the multifunctional thiol (D) unit may be, for example, 0.05 to 20 parts by mass, preferably 0.1 to 15 parts by mass, and more preferably 0.1 to 10 parts by mass in relation to 100 parts by mass of the total of (A) to (E) units. If the amount proportion of the (D) unit is less than 0.05 parts by mass, the heat resistance of the fine resin particle to the heat load when compounded with resins may deteriorate, and if the proportion exceeds 20 parts by mass, the fine resin particle may smell sulfur, which may lower the product value.

The amount proportion of the other monomer unit (E) may be, for example, 0 to 70 parts by mass, preferably 0 to 50 parts by mass, and more preferably 0 to 25 parts by mass in relation to 100 parts by mass of the total of (A) to (E) units. If the (E) unit exceeds 70 parts by parts by mass, heat resistance may be low, or the residual amount of unreacted monomers in the fine resin particle may become large.

<Thermal Decomposition Initiation Temperature and Weight Loss Rate>

The thermal decomposition initiation temperature of the fine resin particle of the present invention under a nitrogen atmosphere is preferably 300° C. or higher and more preferably 330° C. or higher. If the thermal decomposition initiation temperature is lower than 300° C., the fine resin particle cannot withstand the heat load when compounded with resins, which may cause resin drooling, resulting in a lower yield.

In the present invention, a thermal decomposition initiation temperature is obtained using a simultaneous thermogravimetry/differential thermal analyzer by thermally decomposing the fine resin particle by the method and conditions described below in the Examples to obtain a TG/DTA curve and analyzing the resulting TG/DTA curve by an analysis software attached to the analyzer.

The fine resin particle of the present invention has a weight loss rate due to the decomposition of organic components of a polymer after being held at 270° C. for 40 minutes under an air atmosphere of 30% or less, preferably 20% or less, and more preferably 15% or less, in order to ensure heat resistance. If the weight loss rate exceeds 30%, the heat resistance of the fine resin particle may deteriorate, and the fine resin particle cannot withstand the heat load when compounded with resins, which may cause resin drooling, resulting in a lower yield.

In the present invention, a weight loss rate is obtained using a simultaneous thermogravimetry/differential thermal analyzer by holding a fine resin particle at 270° C. for 40 minutes under the conditions described below in the Examples and measuring the weight loss on heating to determine the weight loss rate.

<Residual Monomer Amount>

The fine resin particle of the present invention has reduced residual monomer amount, and the total residual monomer amount of the monofunctional vinylic monomer (A), monofunctional alkyl (meth)acrylate-based monomer (B), and multifunctional (meth)acrylate-based monomer (C) in the fine resin particle may be, for example, 300 ppm by mass or less, preferably 200 ppm by mass or less, and more preferably 100 ppm by mass. If the total residual monomer amount of the monofunctional vinylic monomer (A), monofunctional alkyl (meth)acrylate-based monomer (B), and multifunctional (meth)acrylate-based monomer (C) exceeds 300 ppm by mass, resin drooling may occur when the resin composition containing the fine resin particle is compounded.

In the present invention, the total residual monomer amount of the monofunctional vinylic monomer (A), the monofunctional alkyl (meth)acrylate-based monomer (B), and the multifunctional (meth)acrylate-based monomer (C) in the fine resin particle may be determined by, for example, a method described below.

To 0.01 g of fine resin particle, 5 mL of methanol is added, thoroughly mixed, and allowed to stand for 24 hours to obtain a dispersion solution. Next, the dispersion is treated by a centrifuge separator for 30 minutes at a stirring rotation number of 18,500 rpm to precipitate undissolved matters. A portion of 2 μL of the resulting supernatant is analyzed by an ultra-high-performance liquid chromatogram, La Chrom Ultra (manufactured by Hitachi High-Technologies Corporation), to measure a residual monomer amount to the fine resin particle. Measurement conditions are as follows: La Chrom Ultra C18 2 μm is used as a column, and the column temperature is set to 40° C. A mixture of 0.05% trifluoroacetic acid aqueous solution and acetonitrile (50/50 w/w) is used as a solvent, and the flow rate is set to 0.6 mL/min.

<Residual Monomer Amount in Gas Produced when Fine Resin Particle is Heated to 300° C.>

The fine resin particle of the present invention has a reduced residual monomer amount, and the total residual monomer amount of the monofunctional vinylic monomer (A) with a cyclic structure in a molecular structure, the monofunctional alkyl (meth)acrylate-based monomer (B), and the multifunctional (meth)acrylate-based monomer (C) in the gas produced when the fine resin particle is heated to 300° C. can be, for example, 5,000 ppm by mass or less, preferably 4,000 ppm by mass or less, and more preferably 3,000 ppm by mass or less.

If the total residual monomer amount of the monofunctional vinylic monomer (A) with a cyclic structure in a molecular structure, the monofunctional alkyl (meth)acrylate-based monomer (B), and the multifunctional (meth) acrylate-based monomer (C) in the gas produced when the fine resin particle is heated to 300° C. exceeds 5,000 ppm, resin drooling may occur when a resin composition containing the fine resin particle is compounded.

In the present invention, the total residual monomer amount of the monofunctional vinylic monomer (A) with a cyclic structure in a molecular structure, the monofunctional alkyl (meth)acrylate-based monomer (B), and the multifunctional (meth)acrylate-based monomer (C) in the gas produced when the fine resin particle is heated to 300° C. can be obtained using a thermal desorption-gas chromatograph/mass spectrometer (TD-GC/MS).

The total residual monomer amount of the monofunctional vinylic monomer (A) with a cyclic structure in a molecular structure, the monofunctional alkyl (meth)acrylate-based monomer (B), and the multifunctional (meth) acrylate-based monomer (C) in the gas produced when the fine resin particle is heated to 300° C. can be measured using a TD-GC/MS in a manner described, for example, in the Examples and Comparative Examples below.

<Sulfur Element Content>

The fine resin particle of the present invention contains sulfur elements derived from multifunctional thiols, seed particles, and other materials. The sulfur element content in the present invention is based on X-ray fluorescence analysis.

The sulfur element content is not particularly limited and is set as appropriate according to the purposes or applications. For example, the sulfur element content may be 0.20 parts by mass or more and preferably 0.25 parts by mass or more. In addition, the sulfur element content may be, for example, 0.75 parts by mass or less.

If the sulfur element content in the fine resin particle is less than 0.20 parts by mass, the abundance ratio of multifunctional thiols in a copolymer is low, and the target heat resistance may not be obtained. In contrast, if the sulfur element content is more than 0.75 parts by mass, the odor of the fine resin particle may be stronger.

The sulfur element content may be measured by X-ray fluorescence analysis in a manner described, for example, in the Examples and Comparative Examples below.

<Residual Surfactant Amount>

The residual surfactant amount in the fine resin particle of the present invention is not particularly limited and is set as appropriate according to the purposes or applications. For example, the residual surfactant amount can be 10,000 ppm by mass or more, preferably 15,000 ppm by mass or more, and more preferably 20,000 ppm by mass or more in relation to the fine resin particle. When the residual surfactant amount is 10,000 ppm by mass or more, the residual surfactant is considered to contribute to the dispersibility of fine resin particles when compounded with resins, resulting in good dispersibility of the fine resin particle in a resin composition. If the residual surfactant amount is less than 100 ppm by mass, the production process of the fine resin particle may become complicated, and it may be disadvantageous in cost or other respects. If the residual surfactant amount exceeds 100,000 ppm by mass, foaming may occur when the fine resin particle is dispersed in a medium.

For example, the residual surfactant amount of the present invention can be determined in the following manner.

The fine resin particle was extracted using a solvent, and the residual surfactant amount was measured using a liquid chromatograph linear ion trap mass spectrometer (LC/MS/MS spectrometer).

As an LC/MS/MS spectrometer, "UHPLC ACCELA", manufactured by Thermo Fisher Scientific, and "Linear Ion Trap LC/MSnLXQ", manufactured by Thermo Fisher Scientific, may be used.

A surfactant content is measured in a manner described in the following.

After weighing about 0.01 g of a fine resin particle in a centrifuge tube, the extractant was poured into the tube, the fine resin particle and the extractant were mixed well, extracted using ultrasonic waves, mixed again, centrifuged, and the resulting supernatant liquid was filtered to make a test solution.

The concentration of surfactants in the test solution was determined using an LC/MS/MS spectrometer, and the content was calculated from the peak area values on the obtained chromatogram using a calibration curve prepared in advance. Then, the surfactant content in the fine resin particle was determined from the measured surfactant concentration in the test solution, the weight of the fine resin particle used as the sample (sample weight), and the amount of extracted solution using the following equation.

$$\text{Surfactant content} = \text{Surfactant concentration in test solution} \times \text{Amount of extracted solution} / \text{Sample weight}$$

The calibration curve is prepared in the following manner.

An intermediate standard solution (methanol solution) of about 1,000 ppm by mass of a surfactant is prepared, and after that, the intermediate standard solution is further diluted with methanol stepwise to prepare standard solutions for calibration curve preparation of 20 ppm by mass, 10 ppm by mass, 5 ppm by mass, and 2.5 ppm by mass. The standard solutions for calibration curve preparation of respective concentrations were measured under the conditions described below to obtain peak area value on a chromatogram of a monitor ion m/z=730 to 830. Each concentration and area value were plotted to obtain an approximate curve (quadratic curve) by a least squares method, and the resulting curve was used as a calibration curve for quantification.

<Volume Primary Average particle size/Coefficient of Variation of Volume Average Primary Particle Diameter>

The volume average primary particle size of the fine resin particle of the present invention is not particularly limited and is set as appropriate according to the purposes or applications. For example, the volume average primary particle size is 100 nm or more and 5,000 nm or less, preferably 100 nm or more and 3,000 nm or less, and more preferably 100 nm or more and 1,000 nm or less. The coefficient of variation of the volume average primary particle size of the fine resin particle of the present invention is not particularly limited and is set as appropriate according to the purposes or applications. For example, the coefficient of variation is 25% or less, preferably 20% or less, and more preferably 15% or less.

The volume average primary particle size and the coefficient of variation may be measured using a laser scattering/diffraction type particle size analyzer, LS 230 (manufactured by Beckman Coulter, Inc.). Water was used as a dispersion medium of a sample, and the refractive index of a polymer was used as the refractive index of a sample. A volume average particle size herein is a value obtained by arithmetic averaging. A coefficient of variation is a value determined from the following equation (2) and represents the distribution width of data.

$$\text{Coefficient of variation (\%)} = \text{Standard deviation} \times 100 / \text{Volume average primary particle size} \quad (2)$$

[Production Method of Fine Resin Particle]

The production method (polymerization method) of the fine resin particle of the present invention is not particularly limited as long as it is a known polymerization method. Examples thereof include seed polymerization, emulsion polymerization, suspension polymerization, dispersion polymerization, or other methods.

In the production method (polymerization method) of the fine resin particle of the present invention, a polymerization initiator, a surfactant (emulsifier), a dispersing agent, or other additives may optionally be used.

<Polymerization Method>

Seed polymerization is a method in which fine polymeric particles obtained by polymerizing monomers are used as seed particles, the monomers are allowed to be absorbed by the above seed particles in a medium, the seed particles are swollen with the monomers, and then the monomers are polymerized in the seed particles. Seed polymerization can produce fine resin particles with a larger particle size than the original seed particles by growing seed particles.

Emulsion polymerization is a polymerization method in which an aqueous medium, a monomer that is difficult to dissolve in this medium, and a surfactant (emulsifier) are mixed, to which is added a polymerization initiator that is soluble in the aqueous medium to perform polymerization. Emulsion polymerization is characterized by a small variation in the particle size of the resulting fine resin particles.

Suspension polymerization is a polymerization method in which monomers are suspended in an aqueous medium by mechanically stirring the monomers and the aqueous medium. Particles produced by suspension polymerization are characterized by a larger particle size with a broader particle size distribution compared to the emulsion polymerization described above. Furthermore, particles with relatively sharp particle size distribution can be produced using a fine emulsifier, such as a homogenizer, a sonicator, or NANOMIZER (registered trademark).

Dispersion polymerization is a method in which monomers are dispersed in a polymerization solvent that may contain a dispersion stabilizer, a polymerization initiator is added, and the monomers are polymerized. In order to prevent particles from coalescing during polymerization, dispersion polymerization is preferably performed under stirring by ultrasonic irradiation and/or by a mechanical stirrer, such as a magnetic stirrer. Dispersion polymerization is characterized in that the particle size can be easily controlled, and fine resin particles can be easily obtained.

In the present invention, a method of producing fine resin particles by seed polymerization is preferably used.

<Polymerization Initiator>

A polymerization initiator used when the fine resin particle of the present invention is produced may be a known polymerization initiator and is not particularly limited.

Fine resin particles may turn yellow when a non-nitrile azo initiator is used as a polymerization initiator. Thus, when the fine resin particle is used in an application requiring very high optical characteristics, such as optical members, it is considered that the tone of the fine resin particle may not satisfy the requirement in some cases.

As the polymerization initiator, a radical polymerization initiator, particularly a thermal polymerization initiator, is preferred. Examples thereof include polymerization initiators such as persulfate salts (for example, ammonium persulfate, potassium persulfate, sodium persulfate, and other persulfates), hydrogen peroxide, organic peroxides, nitrile-azo compounds, and other polymerization initiators.

Specific examples include organic peroxides such as cumene hydroperoxide, di-tert-butyl peroxide, dicumyl peroxide, benzoyl peroxide, lauroyl peroxide, dimethyl bis(tert-butylperoxy) hexane, dimethyl bis(tert-butylperoxy)hexyne-3, bis(tert-butylperoxyisopropyl)benzene, bis(tert-butylperoxy)trimethylcyclohexane, butyl bis(tert-butylperoxy)valerate, tert-butyl peroxy-2-ethylhexanoate, dibenzoyl peroxide, p-menthane hydroperoxide, and tert-butyl peroxybenzoate; nitrile-azo compounds such as 2,2'-azobis(isobutyronitrile), 2,2'-azobis(2-methylbutyronitrile), 2,2'-azobis(2-isopropylbutyronitrile), 2,2'-azobis(2,3-dimethylbutyronitrile), 2,2'-azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(4-methoxy-2,4-dimethylvaleronitrile), 2,2'-azobis(4-ethoxy-2,4-dimethylvaleronitrile), 2,2'-azobis(4-n-butoxy-2,4-dimethylvaleronitrile), 1,1'-azobis(cyclohexane-1-carbonitrile), 2-(carbamoylazo)isobutyronitrile, and 4,4'-azobis(4-cyanopentanoic acid); and other polymerization initiators.

In addition, a redox initiator comprising a polymerization initiator of the persulfate salt and organic peroxide mentioned above and a reducing agent such as sodium formaldehyde sulfoxylate, sodium hydrogen sulfite, ammonium hydrogen sulfite, sodium thiosulfate, ammonium thiosulfate, hydrogen peroxide, sodium hydroxymethanesulfinate, L-ascorbic acid and a salt thereof, and a cuprous salt, a ferrous salt may be used in combination as a polymerization initiator.

Among these, at least one selected from the group consisting of
2,2'-azobis(4-methoxy-2,4-dimethylvaleronitrile),
2,2'-azobis(2,4-dimethylvaleronitrile),
2,2'-azobis(isobutyronitrile),
2,2'-azobis(2-methylbutyronitrile),
1,1'-azobis(cyclohexane-1-carbonitrile),
4,4'-azobis(4-cyanopentanoic acid), cumene hydroperoxide, di-tert-butyl peroxide, dicumyl peroxide, benzoyl peroxide, and lauryl peroxide may be mentioned.

These polymerization initiators may be used singly, or two or more thereof may be mixed and used.

In the present invention, the amount of polymerization initiators used varies depending on the type of the polymerization initiators and can be in the range of 0.1 to 5.0 parts by mass, more preferably in the range of 0.2 to 3.0 parts by mass, and further preferably in the range of 0.3 to 1.0 parts by mass in relation to 100 parts by mass of the total of all monomers used in the polymerization mentioned above.

<Surfactant>

A surfactant that can be used in the production of seed particles that can be used when the fine resin particle of the present invention is produced by seed polymerization is not particularly limited, and it is preferred to use at least one reactive surfactant.

Examples of anionic reactive surfactants include metal salts of styrenesulfonic acid, such as SPINOMAR (registered trademark) NaSS (manufactured by Tosoh Finechem Corporation), and ELEMINOL (registered trademark) JS-20 and RS-3000, manufactured by Sanyo Chemical Industries, Ltd., AQUALON (registered trademark) KH-10, KH-1025, KH-05, HS-10, HS-1025, BC-0515, BC-10, BC-1025, BC-20, BC-2020, AR-1025, and AR-2025, manufactured by DKS CO. Ltd., LATEMUL (registered trademark) S-120, S-180A, S-180, and PD-104, manufactured by Kao Corporation, ADEKA REASOAP (registered trademark) SR-1025 and SE-10N, manufactured by ADEKA Corporation, and other anionic reactive surfactants.

These anionic reactive surfactants may be used singly, or two or more thereof may be mixed and used.

Examples of nonionic reactive surfactants include alkyl ether nonionic reactive surfactants (examples of commercial products include ADEKA REASOAP ER-10, ER-20, ER-30, ER-40, manufactured by ADEKA Corporation, LATEMUL PD-420, PD-430, and PD-450, manufactured by Kao Corporation, and other surfactants); alkyl phenyl ether or alkyl phenyl ester nonionic reactive surfactants (examples of commercial products include AQUALON RN-10, RN-20, RN-30, RN-50, AN-10, AN-20, AN-30, and AN-5065 manufactured by DKS, Co., Ltd., ADEKA REASOAP NE-10, NE-20, NE-30, and NE-40 manufactured by ADEKA Corporation, and other surfactants); (meth)acrylate sulfuric acid ester nonionic reactive surfactants (examples of commercial products include RMA-564, RMA-568, and RMA-1114, manufactured by Nippon Nyukazai Co., Ltd., and the other nonionic reactive surfactants), etc.

These nonionic reactive surfactants may be used singly, or two or more thereof may be mixed and used.

When the fine resin particle of the present invention is produced, at least one selected from the group consisting of anionic surfactants, cationic surfactants, amphoteric surfactants, and nonionic surfactants is used.

Examples of anionic surfactants include sodium oleate; fatty acid soaps such as castor oil potassium soap; alkyl sulfate salts such as sodium lauryl sulfate and ammonium lauryl sulfate; alkyl benzene sulfonate salts such as sodium dodecylbenzenesulfonate; alkylnaphthalenesulfonate salts; alkanesulfone acid salts; dialkylsulfosuccinate salts; alkylphosphate ester salts; naphthalenesulfonic acid, polymer with formaldehyde; polyoxyethylene alkyl phenyl ether sulfate salts; polyoxyethylene sulfonated phenyl ether phosphate; polyoxyethylene alkyl sulfate ester salts; and other anionic surfactants.

Examples of nonionic surfactants include polyoxyalkylene branched decyl ether, polyoxyethylene tridecyl ether, polyoxyalkylene alkyl ether, polyoxyalkylene tridecyl ether, polyoxyethylene isodecyl ether, polyoxyalkylene lauryl ether, polyoxyalkylene alkyl ether, polyether polyol, polyoxyethylene styrenated phenyl ether, polyoxyethylene naphthyl ether, polyoxyethylene phenyl ether, polyoxyethylene polyoxypropylene glycol, polyoxyethylene lauryl ether, polyoxyethylene oleylcetyl ether, polyoxyethylene glyceryl triisostearate, polyoxyethylene alkyl ether, polyoxyethylene alkyl phenyl ether, polyoxyethylene fatty acid ester, sorbitan fatty acid ester, polyoxy sorbitan fatty acid ester, polyoxyethylene alkyl amine, glycerin fatty acid ester, oxyethylene-oxypropylene block polymer, and other nonionic surfactants.

Examples of cationic surfactants include alkyl amine salts such as laurylamine acetate and stearylamine acetate; quaternary ammonium salts such as lauryltrimethyl ammonium chloride; and other cationic surfactants.

Examples of amphoteric surfactants include lauryldimethylamine oxide, phosphate ester surfactants, phosphite ester surfactants, and other amphoteric surfactants.

These surfactants may be used singly, or two or more thereof may be mixed and used. The type of surfactants is selected as appropriate, and the amount of surfactants used is also selected as appropriate in consideration of the particle size of the fine resin particle to be obtained, the dispersion stability of monomers during polymerization, or other respects.

The amount of surfactants used can be in the range of preferably 0.01 to 20 parts by mass, more preferably in the range of 0.05 to 15 parts by mass, and further preferably in the range of 0.1 to 10 parts by mass in relation to 100 parts by mass of all monomers.

<Dispersant>

A dispersant that can be used in the production method of the fine resin particle of the present invention is not particularly limited.

A dispersant can be used for stabilizing the dispersibility of monomer droplets and seed particles when an aqueous medium is used in polymerization.

Examples of dispersants include organic dispersants such as partially hydrolyzed polyvinyl alcohol, polyacrylate salts, polyvinyl pyrrolidone, carboxymethylcellulose, and methylcellulose; and inorganic dispersants such as magnesium pyrophosphate, calcium pyrophosphate, calcium phosphate, calcium carbonate, magnesium phosphate, magnesium carbonate, and magnesium oxide. When an inorganic dispersant is used, it is preferred to use a surfactant in combination.

These dispersants may be used singly, or two or more thereof may be mixed and used. The type of dispersants is selected as appropriate and the amount of dispersants used is selected as appropriate in consideration of the particle size of fine resin particle to be obtained, the dispersion stability of monomers during polymerization, or other respects.

<Polymerization Medium>

A polymerization medium that can be used in the production method of the fine resin particle of the present invention is not particularly limited and may be an aqueous medium or an organic medium (organic solvent). In the present invention, it is preferred to use an aqueous medium.

As aqueous mediums, for example, water alone or a mixture of water and a water-soluble organic solvent, such as a lower alcohol (methanol, ethanol, isopropyl alcohol, etc.), can be used. Water alone is preferred in view of waste liquid treatment.

The amount of aqueous mediums used can be in the range of 200 to 2,000 parts by mass and preferably in the range of 300 to 1,500 parts by mass in relation to 100 parts by mass of the total amount of all monomers. The amount of aqueous mediums used that is equal to or above the lower limit of the range described above can keep the stability of monomer particles, etc., during polymerization and suppress the occurrence of agglomerates of fine resin particles after polymerization. Productivity is likely to be good when the amount of aqueous mediums used is equal to or below the upper limit.

(Seed Polymerization)

The polymerization method of monomers for obtaining seed particles used in seed polymerization is not particularly limited and may be dispersion polymerization, emulsion polymerization, soap-free emulsion polymerization (emulsion polymerization without surfactants as emulsifiers), seed polymerization, suspension polymerization, or other polymerization methods may be used.

In order to obtain fine resin particle with a substantially uniform particle size by seed polymerization, it is necessary first to use seed particles with a substantially uniform particle size and to grow these seed particles in a substantially uniform manner. Seed particles with a substantially uniform particle size, which are used as raw materials, can be prepared by polymerizing monomers with soap-free emulsion polymerization (emulsion polymerization without surfactants), polymerization with surfactants, dispersion polymerization, and other polymerization methods.

The surfactant is not particularly limited, and a reactive surfactant is preferably used. Accordingly, emulsion polymerization, soap-free emulsion polymerization, seed polymerization, and dispersion polymerization are preferred as a method for polymerizing monomers to obtain seed particles.

A polymerization initiator may be optionally used also in seed polymerization for obtaining seed particles. The polymerization initiator is not particularly limited, and a water-soluble radical polymerization initiator is preferably used. The amount of a polymerization initiator used is preferably in the range of 0.1 to 2 parts by mass in relation to 100 parts by mass of monomers used for obtaining seed particles. If the amount of a polymerization initiator used is less than 0.1 parts by mass, the reaction rate is slow and inefficient. In contrast, if the amount exceeds 2.0 parts by mass, the initiator residue may be excessive.

In the polymerization for obtaining seed particles, a molecular weight modifier may be used in order to adjust the weight-average molecular weight of seed particles to be obtained. Examples of molecular weight modifiers include mercaptans such as n-octyl mercaptan and tert-dodecyl mercaptan; α-methylstyrene dimer; terpenes such as γ-terpinene and dipentene; halogenated hydrocarbons such as chloroform and carbon tetrachloride; and other modifiers. The weight-average molecular weight of seed particles obtained can be adjusted by increasing or decreasing the amount of the molecular weight modifier used.

The volume average particle size of seed particles can be adjusted as appropriate according to the average particle size of fine resin particles. The volume average particle size can preferably be 1 to 2,000 nm.

In seed polymerization, seed particles are first added to an emulsion containing monomers and an aqueous medium. This emulsion can be prepared by a known method. For example, an emulsion can be obtained by adding monomers in an aqueous medium and dispersing the monomers with a fine emulsifier, such as a homogenizer, a sonicator, or NANOMIZER (registered trademark).

In seed polymerization, it is preferred to use 0.3 to 15 parts by mass of a surfactant in relation to 100 parts by mass of monomers absorbed to seed particles. As the surfactant, the surfactant mentioned above can be used. If the amount of surfactants used is below the range mentioned above, the polymerization stability may be lower. In contrast, the amount of surfactants used is above the range mentioned above, the residual surfactant amount in the fine resin particles may be excessive, and foaming may occur when the fine resin particles are dispersed in a medium.

Seed particles may be added as they are in an emulsion or may be added in the form of a dispersion in an aqueous medium. After seed particles are added to an emulsion, monomers are absorbed in the seed particles. This absorption can be normally performed by stirring an emulsion at room temperature (about 25° C.) for 1 to 12 hours. Furthermore, the emulsion can be warmed to about 30° C. to 50° C. in order to facilitate the absorption of monomers to seed particles.

Seed particles swell as they absorb monomers. Regarding the mixing ratio between monomers and seed particles, the amount of monomers is preferably in the range of 1 to 100 parts by mass in relation to 1 part by mass of seed particles, and 5 to 50 parts by mass is more preferred. When the mixing ratio of monomer is below the range mentioned above, the increase in particle size by polymerization is small, resulting in lower production efficiency. In contrast, when the mixing ratio of monomer is above the range mentioned above, monomers are not fully absorbed in seed particles, monomers may be emulsion-polymerized themselves independently of the seed polymerization in an aqueous medium, and fine resin particles with abnormal particle size out of the target size may be produced. The end of absorption of monomers to seed particles may be judged by observing the expansion of the particle size by observation with an optical microscope.

Next, the polymerization of monomers absorbed in seed particles produces a dispersion containing fine resin particles.

Alternatively, a dispersion containing fine resin particles may be obtained by repeating the step of absorbing monomers in seed particles and polymerizing the monomers.

When monomers absorbed in seed particles are polymerized, a polymerization initiator may optionally be added. After a polymerization initiator is mixed with monomers, the resulting mixture may be dispersed in an aqueous medium, or both a polymerization initiator and monomers may be separately dispersed in an aqueous medium and mixed. The particle size of the droplets of monomers existing in the resulting emulsion is preferably smaller than the particle size of seed particles because monomers are efficiently absorbed in seed particles.

As the polymerization initiator, the polymerization initiator mentioned above may be used. It is preferred to use a polymerization initiator in an amount in the range of 0 to 3 parts by mass in relation to 100 parts by mass of monomers.

The polymerization temperature of seed polymerization can be selected as appropriate according to the type of monomers and a polymerization initiator, which may be optionally used. For example, the polymerization temperature can be 25° C. to 110° C. and preferably 50° C. to 100° C.

The polymerization time of seed polymerization can be selected as appropriate according to the type of monomers and a polymerization initiator, which may be optionally used. For example, the polymerization time can be 1 to 12 hours.

Seed polymerization may be performed under an inert gas (for example, nitrogen) atmosphere with respect to polymerization.

During seed polymerization, it is preferred to raise the temperature after monomers and a polymerization initiator, which may be optionally used, have been completely absorbed in seed particles.

In seed polymerization, the dispersant mentioned above may be added to the polymerization reaction system as a dispersion stabilizer in order to improve the dispersion stability of the fine resin particle. Among these dispersion stabilizers, polyvinyl alcohol and polyvinyl pyrrolidone are preferred. The addition amount of the dispersion stabilizer is preferably in the range of 1 to 10 parts by mass in relation to 100 parts by mass of monomers.

In order to suppress the occurrence of emulsion polymerization products (fine resin particles with a too-small particle size) in an aqueous medium during the polymerization reaction, a water-soluble polymerization inhibitor such as nitrite salts, including sodium nitrite, sulfite salts, hydroquinones, ascorbic acids, water-soluble vitamin Bs, citric acid, and polyphenols may be added to an aqueous medium. For example, the polymerization inhibitor added can be 0.002 to 0.2 parts by mass in relation to 100 parts by mass of monomers.

As a preferable embodiment of a method for producing a fine resin particle of the present invention, a method for producing a fine resin particle, comprising a first polymerization step of polymerizing an emulsion containing monomers, an aqueous medium, and a surfactant with a water-soluble polymerization initiator in a polymerization vessel purged with nitrogen to produce seed particles and a second polymerization step of allowing an emulsion containing monomers, an aqueous medium, and a surfactant to be absorbed in the seed particles and thereafter polymerizing the emulsion may be mentioned.

<Washing, Drying, Deagglomeration, and Classification of Fine Resin Particle>

The fine resin particle may optionally be subjected to washing, drying, deagglomeration, classification, etc., after the completion of polymerization. For example, after the completion of polymerization, methods, including suction filtration, centrifugation, pressure separation, etc., may be performed to prepare a cake (wet cake) containing an aqueous medium, then optionally subjecting the cake to a washing step of washing the cake with water and/or a solvent, then drying the cake in a drying step, and optionally subjecting the cake to a deagglomeration step and a classification step to isolate dried powder.

The washing method in the washing step is not particularly limited. For example, a water dispersion obtained after polymerization can be washed by centrifugal washing, cross-flow filtration washing, or other washing methods. Alternatively, after preparing the cake, the cake may be washed by immersing the cake in water and/or a solvent and removing liquid from the cake. When a reactive emulsifier is used, washing a water dispersion obtained after polymerization can be omitted.

The drying method in the drying step is not particularly limited. For example, spray drying using a spray dryer, freeze-drying, drying by attaching an object to a heated rotating drum such as a drum dryer, or other drying methods may be used.

The classification method in the classification step is not particularly limited. For example, fine resin particles or granulated bodies may be classified by known means using sieves or other means. The classification step preferably includes at least one of a first classification step of classifying fine resin particles obtained in the second polymerization step mentioned above and a classification step of classifying fine resin particles obtained in the deagglomeration step mentioned above.

Alternatively, a classification step, in which a water dispersion obtained after polymerization is optionally dispersed in an organic solvent such as alcohols, toluene, or ketone, and the dispersion is allowed to pass through a sieve net to remove coarse particles, may be used.

[Granulated Body]

The fine resin particle of the present invention can be formed into a granulated body configured of agglomerates of a plurality of fine resin particles.

The granulated body can be obtained through a spray-drying step of spray-drying fine resin particles obtained in the polymerization step under the condition of, for example, the inlet temperature of 80° C. to 220° C. and the outlet temperature or 50° C. to 100° C. to obtain the granulated body. The resulting granulated body is easier to handle than the fine resin particles themselves.

In the present invention, a deagglomeration step, in which the resulting granulated body is deagglomerated to disperse fine resin particles. For example, a dry deagglomeration step using a blade mill and a super rotor, which are mechanical grinders, and a nano grinding mill (jet mill), which is an air-flow grinder, or other grinders, and a wet deagglomeration step using a bead mill, a ball mill, a hammer mill, or other mills may be mentioned.

Deagglomerated and dispersed fine resin particles have good dispersibility in solvents.

In the present invention, it is preferred to include a classification step of classifying granulated bodies.

Classification can be performed by known means.

The volume average particle size of the granulated body of the present invention is, for example, 5 to 200 μm, and preferably 10 to 100 μm.

[Applications of Fine Resin Particle]

The fine resin particle and a granulated body thereof of the present invention have very high optical characteristics (colorless transparency), are resistant to heat load, and have a very low residual amount of unreacted monomers. For this reason, when a resin composition is formed, the impact on film haze or other properties can be suppressed, even when the addition amount is increased. Furthermore, the occurrence of resin drooling due to heat load, etc., when compounded with resins, or unreacted monomers in the fine resin particle is suppressed, and the yield decrease is less likely to occur.

The fine resin particle or a granulated body thereof of the present invention may be used for various applications by taking advantage of these characteristics. For example, they can be used as anti-sticking agents (anti-blocking agents) for resin-molded articles (resin films), modifiers for various resin-molded articles, optical members such as light diffusion plates, paint additives, spacer applications between microsites of various electronic devices, pore-forming agents of various battery members, core particles of fine conductive particles that establish an electrical connection, or other applications.

For example, a fine resin particle itself may be mixed with a resin as an anti-sticking agent (anti-blocking agents) for resin films to form a resin composition, and resin-molded articles such as films can be formed. In particular, the fine resin particle of the present invention has very high optical characteristics (colorless transparency) and is useful as an anti-sticking agent (anti-blocking agent) for cyclic olefin resin films.

For example, a resin composition comprising fine resin particles and a resin binder is formed, and optical films, such as anti-glare films and light diffusion films, and optical components, such as light diffusion plates, in particular, anti-glare components, can be obtained from this resin composition.

For example, a paint composition can be obtained as a fine resin particle itself or a mixture of the fine resin particle with binder resins, additives, or other components.

For example, a resin-molded article can be obtained by forming a fine resin particle itself or a mixture of the fine resin particle with resins.

EXAMPLES

The present invention will be specifically described below with Examples and Comparative Examples, but the present invention is not limited to these.

The volume average particle diameter, CV value (volume-based coefficient of variation of particle diameter), and thermal decomposition initiation temperature of the resulting fine resin particle were determined by the methods described below.

5% Thermal Decomposition Initiation Temperature

The weight loss on heating of a fine resin particle is measured using a simultaneous thermogravimetry/differential thermal analyzer, "TG/DTA 6200" (manufactured by SII NanoTechnology Inc.) The way of sampling and the temperature conditions are as follows. First, a test sample is prepared by filling about 15 mg of a sample on the bottom of a platinum measurement container with no gaps and measured under a nitrogen gas flow rate of 230 mL/min using alumina as a reference substance. For temperature conditions, a TG/DTA curve when the temperature is raised from 30° C. to 800° C. at a temperature ramp rate of 10° C./min is obtained. The resulting curve is analyzed using analysis software attached to the analyzer to obtain a thermal decomposition initiation temperature. A thermal decomposition initiation temperature herein means a mass loss initiation temperature disclosed in JIS K 7120:1987, "Testing Methods of Plastics by Thermogravimetry." (8. "How to Read TG Curve") and is a value obtained in accordance with this standard.

[Weight Loss Rate]

A weight loss on heating after holding fine resin particles in the air at 270° C. for 40 minutes was measured using a simultaneous thermogravimetry/differential thermal analyzer, "TG/DTA 6200" manufactured by SII NanoTechnology Inc.), to obtain a weight loss rate. During the measurement of a weight loss on heating, the temperature was raised from room temperature to 200° C. at a ramp rate of about 40° C./min, and then the ramp rate was gradually lowered. The time to reach 270° C. from room temperature was adjusted to 20 minutes, and the weight loss was calculated by measuring the weight loss after holding the same temperature for 40 minutes while setting the time when the temperature was reached 270° C. to time 0.

[Measurement Method of Residual Monomer Amount in Fine Resin Particle]

To 0.01 g of fine resin particles, 5 mL of methanol is added, then thoroughly mixed, and allowed to stand for 24 hours to obtain a dispersion solution. Next, the dispersion is treated by a centrifuge separator for 30 minutes at a stirring rotation number of 18,500 rpm to precipitate undissolved matters. A portion of 2 μL of the resulting supernatant is analyzed by an ultra-high-performance liquid chromatogram, La Chrom Ultra (manufactured by Hitachi High-Technologies Corporation), to measure a residual monomer amount to the vinylic polymer particles. Measurement conditions are as follows: "La Chrom Ultra C18" 2 μm is used as a column, and the column temperature is set to 40° C. As a solvent, a mixture of 0.05% trifluoroacetic acid aqueous solution and acetonitrile (50/50 w/w) is used, and the flow rate is set to 0.6 mL/min.

[Measuring Method of Residual Monomer Amount in Gas Produced when Fine Resin Particle is Heated to 300° C.]

(Measurement Method of TD-GC/MS)

A residual monomer amount in the gas produced when the fine resin particles were heated to 300° C. was measured using "Multi-Shot Pyrolyzer 3030D" (manufactured by Frontier Laboratories Ltd.) and "GC/MS (7890/5977)" (manufactured by Agilent Technologies Inc.). Fine resin particles were weighed in a dedicated container for analysis, the gas produced in the heating condition described above was trapped with liquid nitrogen, and heat extraction (Desorp)-GC/MS analysis was performed. Quantitative analysis was performed using toluene ($C_7H_8$) as a standard substance, and quantitative calculations were performed by comparing the area value of each peak with the area of the standard substance in terms of toluene.

<Heat Extraction Condition>

Initial temperature=80° C. (held for 0 minutes)
First stage ramp rate=20° C./min (up to 300° C.)
Final temperature=300° C. (held for 15 minutes)

<GC/MS Measurement Condition>

Carrier Gas=He
He flow rate=1 mL/min
Inlet temperature=280° C.
Interface temperature=290° C.
Ionization energy=70 eV
Detection method=Scan method (m/z=33 to 600)

[Measurement Method of Sulfur Element Content]

The S-Kα intensity was measured using an X-ray fluorescence spectrometer, "ZSX Primus IV" (manufactured by Rigaku Corporation) in the conditions described below, and a sulfur element content was measured by an order analysis method using $C_7H_{10}O_3$ as a balance. A test sample was prepared as follows: A 10 mg portion of a sample was weighed on a carbon sample table (manufactured by Nisshin-EM K.K.), and the sample was adjusted so that it did not spread 10 mmφ or more. After that, the sample was covered with a PP film "Cat No. 3399 G 003" (manufactured by Rigaku Corporation) and set to a sample case for 10 mmφ, which was attached to the spectrometer, to prepare a measurement sample.

<Device Condition>

Apparatus=X-ray fluorescence spectrometer, "ZSX Primus IV" (manufactured by Rigaku Corporation)
X-ray tube=vertical Rh tube (3.0 KW)
Analysis diameter=10 mmφ
Spin=not spun
Atmosphere=vacuum
Sample form=metal
Balance component=$C_7H_{10}O_3$
Sample film=P.P. Film
Sample weight thickness=set <Qualitative Elemental Condition>

S-Kα
Bulb=Rh (30 kV-100 mA)
Primary filter=OUT
Attenuator=1/1
Slit=S4
Analyzing crystal=GeH
2Θ=110.830 deg (measurement range=107 to 115 deg)
PHA=150 to 300
Step=0.05 deg
Time=0.15 sec

Measurement Method of Residual Surfactant Amount

The fine resin particle was extracted using a solvent (methanol), and the residual surfactant amount was measured using a liquid chromatograph linear ion trap mass spectrometer (LC/MS/MS spectrometer), "ACCELA UHPLC" (manufactured by Thermo Fisher Scientific).

A surfactant content was measured in a manner described in the following.

About 0.05 g of fine resin particle was weighed precisely in a centrifuge tube. A methanol extractant was poured into this tube, and the fine resin particle and the extractant were mixed well.

After the ultrasonic extraction for about 15 minutes, the fine resin particle and the extractant were mixed again, centrifuged at 3,500 rpm for 15 minutes, and the resulting supernatant liquid was filtered to make a test solution.

The concentration of surfactants in the test solution was determined using the liquid chromatograph linear ion trap mass spectrometer (LC/MS/MS spectrometer) mentioned above, and the content was calculated from the peak area values on the obtained chromatogram using a calibration curve prepared in advance. Then, the surfactant content in the fine resin particle was determined from the measured surfactant concentration in the test solution, the weight of the fine resin particle used as the sample (sample weight), and the amount of extracted solution using the following calculation equation.

Surfactant content=Surfactant concentration in test solution×Amount of extracted solution/Sample weight The calibration curves of three types of surfactants used (dioctyl sulfosuccinate sodium salt, nonylphenol ethoxylate, and polyoxyalkylene styrenated phenyl ether) were prepared in the following manner.

An intermediate standard solution (methanol solution) of about 1,000 ppm by mass of a surfactant was prepared, and after that, the intermediate standard solution was further diluted with methanol stepwise to prepare standard solutions for calibration curve preparation of 20 ppm by mass, 10 ppm by mass, 5 ppm by mass, and 2.5 ppm by mass. The standard solutions for calibration curve preparation of each concentration were measured under the conditions described below to obtain peak area value on a chromatogram of a monitor ion m/z=421.3-227.2 (dioctyl sulfosuccinate sodium salt), 502.3-485.2 (nonylphenolethoxylate) and 587.6-526.7 (polyoxyalkylene styrenated phenyl ether). Each concentration and area value were plotted to obtain an approximate curve (quadratic curve) by a least squares method, which was used as a calibration curve for quantification.

<LC Measurement Condition>

Apparatus="ACCELA UHPLC" (manufactured by Thermo Fisher Scientific)
Column="Hypersil GOLD C18" 1.9 μm (2.1 mm I.D.×100 mmL) (manufactured by Thermo Fisher Scientific)
Column temperature=40° C.
Mobile phase=(A: 10 mM acetic acid ammonium/B: acetonitrile)
Mobile phase condition=(0 min=Bconc. 90%, 0→0.5 min=Bconc. 90%→100%, 0.5→1.0 min=Bconc. 100%, 1.0→1.1 min=Bconc. 100→90%, 1.1 min→3.5 min=Bconc. 90%)
Flow rate=0.3 mL/min
Pump temperature=room temperature
Injection amount=2 μL <MS/MS Measurement Condition>

Device="LXQ" Linear Ion Trap LC/MS/MS (manufactured by Thermo Fisher Scientific)
Ionization=ESI/negative
Sheath Gas/AUX Gas/Sweep Gas=30/10/0 arb Spray Voltage=5.0 kV Capillary Temp=350° C.

Capillary voltage/Tube Lens=−20/−100V

Monitoring Mass (m/z)=dioctyl sulfosuccinate sodium salt (421.3→227.2), nonylphenol ethoxylate (502.3→485.2), and polyoxyalkylene styrenated phenyl ether (587.6→526.7)

Volume Average Particle Size

The volume average particle size and the number average particle size of fine resin particles were measured by a laser diffraction/scattering particle size distribution analyzer, "LS 230" (manufactured by Beckman Coulter, Inc.). Specifically, 0.1 g of a fine resin particle water dispersion (solid content: 20%) and 20 ml of 2% by mass of an anionic surfactant solution were put in a test tube. After that, the fine resin particles were dispersed over 5 minutes using a test tube mixer, "test tube mixer TRIO HM-1N" (manufactured by AS ONE Corporation), and an ultrasonic cleaner, "ULTRASONIC CLEANER VS-150" (manufactured by AS ONE Corporation) to obtain a dispersion. The volume average particle size and the number average particle size of the fine resin particles in the resulting dispersion were measured while irradiating the resulting dispersion with ultrasonic waves in a laser diffraction/scattering particle size distribution analyzer. The measurement conditions of the laser diffraction/scattering particle size distribution analyzer are as follows.

<Measurement Conditions of Laser Diffraction/Scattering Particle Size Distribution Analyzer>

Medium=water

Refractive index of medium=1.333

Refractive index of solid=refractive index of fine resin particles PIDS relative concentration: 40% to 55%

The optical model for the measurement was matched to the refractive index of the produced fine resin particles. In the present invention, where plural types of monomers are used in the production of the fine resin particles, an average obtained by weighting and averaging the refractive indexes of homopolymers of each monomer by the amount (parts by mass) of each monomer used was used as the refractive index of fine resin particles.

A volume-based particle size distribution of the fine resin particles was obtained from the measurement result. The arithmetic mean of the volume-based particle size distribution is regarded as the volume average particle size of the fine resin particles.

CV Value (Coefficient of Variation of Volume-Based Particle Size)

The coefficient of variation (CV value) of the volume-based particle size of the fine resin particles was calculated from the following equation.

Coefficient of variation of volume-based particle size of fine resin particles=[(Standard deviation of volume-based particle size distribution of fine resin particles)/(Volume average particle size of fine resin particles)]×100

Production Example of Seed Particle

In a polymerization vessel provided with a stirrer, a thermometer, and a cooling mechanism, 270 parts by mass of deionized water and 0.07 parts by mass of sodium styrenesulfonate were mixed to prepare a water phase. In another vessel, 120 parts by mass of methyl methacrylate and 2.4 parts by mass of 1-octanethiol were mixed and fed in the water phase in the polymerization vessel. The polymerization vessel was purged with nitrogen for 5 minutes, the temperature was then raised to 80° C., and at the time when the temperature reached 80° C., 0.05 parts by mass of potassium persulfate dissolved in 10 parts by mass of deionized water was fed. After that, the polymerization vessel was purged with nitrogen again for another 5 minutes, and the mixture was stirred at 80° C. for 5 hours to perform an emulsion polymerization reaction. After that, the temperature was raised to 100° C., held at the same temperature for 3 hours, and then cooled to form a fine resin particle-containing slurry. This slurry was used for seed particles.

Example 1

In a polymerization vessel provided with a stirrer, a thermometer, and a cooling mechanism, 260 parts by mass of deionized water and 0.13 parts by mass of Rapizol (registered trademark) A-80 (manufactured by NOF Corporation), 0.13 parts by mass of PHOSPHANOL LO-529, manufactured by TOHO Chemical Industry Co., Ltd.), 0.13 parts by mass of NOIGEN EA-167 (manufactured by DKS CO. Ltd.), and 0.022 parts by mass of sodium nitrite were mixed to form a water phase.

In another vessel, 46 parts by mass of butyl acrylate, 30 parts by mass of styrene, 24 parts by mass of ethylene glycol dimethacrylate, 0.5 parts by mass of pentaerythritol tetrakis (thioglycolate), 0.5 parts by mass of 2,2'-azobis(2,4-dimethylvaleronitrile), and 0.2 parts by mass of benzoyl peroxide were mixed well to form an oil phase.

The oil phase was fed in the water phase in the polymerization vessel, and the resulting mixture was stirred at 8,000 rpm with T.K. HOMO MIXER (manufactured by PRIMIX Corporation) for 10 minutes to obtain a monomer-mixed liquid. To this monomer mixed liquid, 21.7 parts by mass of seed particle A, prepared in Production Example 1, was fed and stirred for 3 hours to swell. After that, the polymerization vessel was purged with nitrogen for 5 minutes, then the temperature was raised to 55° C., and the mixture was stirred at 55° C. for 5 hours to perform the polymerization reaction. After adding 0.066 parts by mass of sulfamic acid, the temperature was raised to 100° C., held at the same temperature for 3 hours, and then cooled to form a fine resin particle-containing slurry.

The fine resin particle-containing slurry was passed through a mesh of 400 Mesh to classify the fine resin particles, thereby obtaining a classified fine resin particle slurry.

The volume average primary particle size of the resulting fine resin particles was 0.489 μm (489 nm), and the coefficient of variation (CV value) of the volume average primary particle size was 13.9%.

The 5% thermal decomposition initiation temperature [° C.], weight loss rate [%], residual monomer amount [ppm by mass], sulfur element content [parts by mass], and residual surfactant amount [ppm by mass] of the resulting fine resin particles are shown together in Table 1.

The classified fine resin particle slurry was spray-dried under the apparatus conditions described below using a spray dryer (manufactured by Sakamoto Giken K.K., machine name: Spray Dryer, Model: Atomizer take-up system, Model number: TRS-3WK) to obtain the granulated body of the fine resin particles.

<Apparatus Conditions>

Feeding rate of slurry containing fine resin particles: 25 mL/min

Rotation number of atomizer: 12,000 rpm

Airflow: 2 $m^3$/min

Inlet temperature (the temperature of the slurry inlet containing fine resin particles provided in the spray dryer into which the slurry containing the fine resin particles is sprayed and introduced): 150° C.

Outlet temperature (the temperature of the powder outlet provided in the spray dryer from which the granulated body of the fine resin particles is discharged): 70° C.

Examples 2 and 3 and Comparative Examples 1 and 2

Table 1 shows monomers, multifunctional thiols, and polymerization initiators used in the polymerization of fine resin particles according to Examples 2 and 3 and Comparative Examples 1 and 2, and the amounts (mass proportions) thereof. The 5% thermal decomposition initiation temperature [° C.], weight loss rate [%], residual monomer amount [ppm by mass], sulfur element content [parts by mass], residual surfactant amount [ppm by mass], volume average primary particle size [μm], and CV value [%] of the resulting fine resin particles are shown together in Table 1.

Comparative Example 3

In a polymerization vessel provided with a stirrer, a thermometer, and a cooling mechanism, 2 parts by mass of magnesium pyrophosphate as a suspension stabilizer and 0.03 parts by mass of Rapizol (registered trademark) A-80 (manufactured by NOF Corporation) were added to 100 parts by mass of deionized water to form a water phase.

Then, 50 parts by mass of methyl methacrylate, 30 parts by mass of styrene, 20 parts by mass of ethylene glycol dimethacrylate, 0.5 parts by mass of 2,2'-azobis(2,4-dimethylvaleronitrile), and 0.2 parts by mass of benzoyl peroxide were mixed well to form an oil phase.

An oil phase was fed in the water phase in the polymerization vessel, and the resulting mixture was stirred at 8,000 rpm with T.K. HOMO MIXER (manufactured by PRIMIX Corporation) for 10 minutes to obtain a monomer-mixed liquid. The polymerization vessel was purged with nitrogen for 5 minutes, the temperature was raised to 55° C., and the mixture was stirred at 55° C. for 5 hours to perform an emulsion polymerization reaction. After adding 0.01 parts by mass of sulfamic acid, the temperature was raised to 100° C., held at the same temperature for 3 hours, and then cooled to form a fine resin particle-containing slurry.

Hydrochloric acid was added to the resulting fine resin particle-containing slurry to decompose magnesium pyrophosphate, and then suction filtration was performed to take out fine resin particles. After repeated washing with water and purification, the fine resin particles were obtained by drying in a vacuum oven at 60° C.

The 5% thermal decomposition initiation temperature [° C.], weight loss rate [%], residual monomer amount [ppm by mass], sulfur element content [parts by mass], residual surfactant amount [ppm by mass], volume average primary particle size [μm], and CV value [%] of the resulting fine resin particles are shown together in Table 1.

TABLE 1

| | | Examples | | | Comparative Examples | | |
|---|---|---|---|---|---|---|---|
| | | 1 | 2 | 3 | 1 | 2 | 3 |
| Monomer (A) [parts by mass] | St | 30 | 50 | 30 | 30 | 30 | 30 |
| Monomer (B) [parts by mass] | MMA | — | — | 23 | 46 | 50 | 50 |
| | BA | 46 | 30 | 23 | — | — | — |
| Monomer (C) [parts by mass] | EGDMA | 24 | 20 | 24 | 24 | 20 | 20 |
| Polyfunctional thiol (D) [parts by mass] | PETG | 0.5 | 0.5 | 0.5 | 0.5 | — | — |
| Polymerization initiator [parts by mass] | ABN-V | 0.5 | 0.5 | 0.5 | 0.5 | 0.5 | 0.5 |
| | BPO | 0.2 | 0.2 | 0.2 | 0.2 | 0.2 | 0.2 |
| Glass transition temperature of polymer consisting only of monomer (B) [° C.] | | −55 | −55 | 3.5 | 105 | 105 | 105 |
| 5% Thermal decomposition initiation temperature [° C.] | | 361.8 | 365.0 | 350.7 | 340.2 | 334.1 | 332.7 |
| Weight loss rate [%] | | 13.3 | 9.4 | 19.8 | 31.3 | 41.0 | 40.8 |
| Residual monomer amount in fine resin particle [ppm by mass] | | 61 | 39 | 212 | 677 | 823 | 727 |
| Residual monomer amount in gas produced when fine resin particle is heated to 300° C. [ppm by mass] | | 2685 | 2580 | 4820 | 20500 | 22000 | 21200 |
| Sulfur element content [parts by mass] | | 0.30 | 0.32 | 0.3 | 0.29 | 0.19 | 0.004 |
| Residual surfactant amount [ppm by mass] | | 25800 | 24200 | 27700 | 26100 | 25300 | 230 |
| Volume average primary particle size [μm] | | 0.489 | 0.401 | 0.302 | 0.556 | 0.383 | 4.52 |
| Coefficient of variation of volume average primary particle size (CV value) [%] | | 13.9 | 14.1 | 15.6 | 13.8 | 14.9 | 43.3 |

In Table 1, the rows from St to BPO represent the parts by mass (mass proportions) of compounds used to prepare fine resin particles, and the compounds indicated by each abbreviation are as follows.

MMA: methyl methacrylate
BA: butyl acrylate
St: styrene
EGDMA: ethylene glycol dimethacrylate
PETG: pentaerythritol tetrakis(thioglycolate)
ABN-V: 2,2'-azobis(2,4-dimethylvaleronitrile)
BPO: benzoyl peroxide The present invention can be implemented in various other forms without departing from the spirit or main features thereof. Thus, the Examples described above are merely illustrative in all respects and must not be interpreted restrictively. The scope of the present invention is indicated by the claims and is not bound by the text of the description in any way. Furthermore, variations and modifications belonging to the equivalents of the claims are all within the scope of the present invention.

The invention claimed is:

1. A fine resin particle comprising a copolymer of at least one monofunctional vinylic monomer (A) unit with a cyclic structure in a molecular structure, at least one monofunctional alkyl (meth)acrylate-based monomer (B) unit, at least one multifunctional (meth)acrylate-based monomer (C) unit, and at least one multifunctional thiol (D) unit, wherein a polymer consisting only of a monofunctional alkyl (meth) acrylate-based monomer (B) has a glass transition temperature of 50° C. or lower, wherein relative to a total of 100 parts by mass of all copolymer units, an amount of the at least one monofunctional vinyl monomer (A) unit with a cyclic structure in a molecular structure is 5 to 80 parts by mass, an amount of the at least one monofunctional alkyl (meth)acrylate monomer (B) unit is 5 to 80 parts by mass, an amount of the at least one multifunctional (meth)acrylate monomer (C) unit is 5 to 50 parts by mass, and an amount of the at least one multifunctional thiol (D) unit is 0.05 to 20 parts by mass, and wherein a 5% thermal decomposition initiation temperature under a nitrogen atmosphere is 345° C. or higher and/or a weight loss rate after holding at 270° C. for 40 minutes under an air atmosphere is 30% or less.

2. The fine resin particle according to claim 1, which is produced by seed polymerization in which seed particles are swollen with monomers in a medium, and then the monomers are polymerized, wherein the monomer comprises the at least one monofunctional vinylic monomer (A) with a cyclic structure in a molecular structure, the at least one monofunctional alkyl (meth)acrylate-based monomer (B), the at least one multifunctional (meth)acrylate-based monomer (C), and the at least one multifunctional thiol (D).

3. The fine resin particle according to claim 1, wherein a total residual monomer amount of the at least one monofunctional vinylic monomer (A) with a cyclic structure in a molecular structure, the at least one monofunctional alkyl (meth)acrylate-based monomer (B), and the at least one multifunctional (meth)acrylate-based monomer (C) is 300 ppm by mass or less.

4. The fine resin particle according to claim 1, wherein a sulfur element content in the fine resin particle is 0.20 parts by mass or more.

5. The fine resin particle according to claim 1, wherein a residual surfactant amount in the fine resin particle is 10,000 ppm by mass or more and 30,000 ppm by mass or less.

6. The fine resin particle according to claim 1, wherein a volume average primary particle size is 100 nm or more and 5,000 nm or less and/or a coefficient of variation of a volume average primary particle size is 25% or less.

7. The fine resin particle according to claim 1, wherein the at least one multifunctional (meth)acrylate-based monomer (C) is a bifunctional (meth)acrylate monomer.

8. The fine resin particle according to claim 1, wherein an amount of the at least one multifunctional thiol (D) unit is 0.1 parts by mass or more and 10 parts by mass or less in relation to 100 parts by mass of a total of the at least one monofunctional vinylic monomer (A) unit with a cyclic structure in a molecular structure, the at least one monofunctional alkyl (meth)acrylate-based monomer (B) unit, and the at least one multifunctional (meth)acrylate-based monomer (C).

9. A granulated body composed of a plurality of fine resin particles according to claim 1 agglomerated together.

10. The fine resin particle according to claim 1 or a granulated body thereof, which is used as an anti-sticking agent for a resin film.

11. The fine resin particle or a granulated body thereof according to claim 10, wherein the resin film is a cyclic olefin resin film.

* * * * *